Apr. 10, 1923.

A. S. DRIVER ET AL

ARTIFICIAL FLY CONTAINER

Filed July 25, 1922

1,451,295

Inventors
Arthur S. Driver
Susan R. Driver
By their Attorney
Parker W. Page.

Patented Apr. 10, 1923.

1,451,295

UNITED STATES PATENT OFFICE.

ARTHUR S. DRIVER AND SUSAN R. DRIVER, OF SUMMIT, NEW JERSEY.

ARTIFICIAL-FLY CONTAINER.

Application filed July 25, 1922. Serial No. 577,308.

*To all whom it may concern:*

Be it known that we, ARTHUR S. DRIVER and SUSAN R. DRIVER, both subjects of the King of Great Britain, residing at Summit, in the county of Union and State of New Jersey, have invented certain new and useful Improvements in Artificial-Fly Containers, of which the following is a full, clear, and exact description.

The invention which forms the subject of this our application for Letters Patent, is an improvement in containers or receptacles for use of fly fishermen for carrying and drying artificial flies. Heretofore such flies have either been carried in specially constructed books, or simply laid in tin or other boxes, but in either case certain objections, which will be well recognized by sportsmen, have existed to such means of keeping and carrying them. This is particularly true of what are known as dry flies, which are now so extensively used, although it applies generally to all kinds of artificial lures in the nature of flies.

A fisherman, under all but the most exceptional circumstances, is required to frequently change his flies to find that particular variety which the fish will readily take. By use a cast fly becomes wet and soaked, and if put back in the book or even loosely into a box with others, it does not dry properly and, if fugitive colors are used in its make-up it stains the leaves of a book. Dry fly fishermen find it especially difficult to properly dry out their wet flies, so that they may be again treated or coated and re-used.

Another serious objection lies to the use of metal boxes of ordinary character for containing flies with raw silk snells in that the latter are almost inevitably cut or broken by the cover when it is closed.

To avoid these objections we have devised a container for flies of all kinds in which they may be placed and stored in great numbers in proper condition for drying and preservation from injury due to cutting, close packing or rough handling, and this device is a preferably flat receptacle of aluminum adapted to be carried in the pocket, having a watertight cap or cover, and around its edge a narrow ledge or grooved flange containing a substance such as cork, or some rubber composition into which the point of a hook may be readily forced. Both dry and wet flies may be kept in this container, the hooks being embedded in the narrow strip of cork and the snells merely hanging freely down in the open part within the container.

The ledge or flange carrying the cork extends preferably entirely around the container, and it may be inside or outside of the same. If so desired the cap or some other part of the device may have ventilating holes permanently open or adapted to be closed, so that in use, should the container be dropped overboard, it will float without permitting water to reach the inside.

Our improved fly container is shown in the accompanying drawings, in which—

Figure 3:
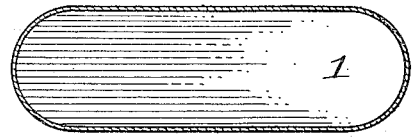
Fig. 3 is a cross section of the form of device shown in Fig. 2 at any point below the upper end.

We prefer to use relatively thin aluminum for the container 1, which is in the form of a flattened box or case of substantially the cross section shown in Fig. 3, to adapt it to be readily carried in the pocket. Its length may be any desired, as some flies have short loops or snells, some long, and others none or practically none at all. It is provided with a watertight cover 2, which may have an offset 3, so that the top edge of the container is somewhat below the upper end of the cover or top.

The container has inside a trough-like flange 4, which, preferably, extends all the way around, and this flange or ledge contains or carries a strip or filling of any suitable soft material such as cork, a rubber composition, or the like 5, into which the points of the hooks 7 may be readily embedded.

The flies or hooks are stuck into this soft strip, and the snells 8 are permitted to hang down in the open space within the container as shown.

Figure 1:
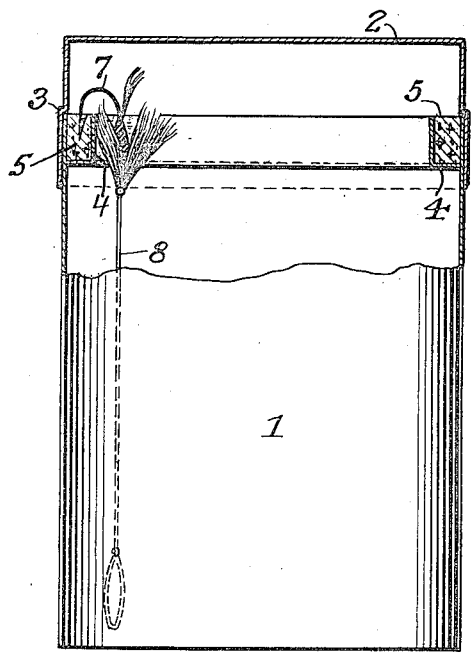
Fig. 1 is a view in central vertical section of the device.
Figure 2:
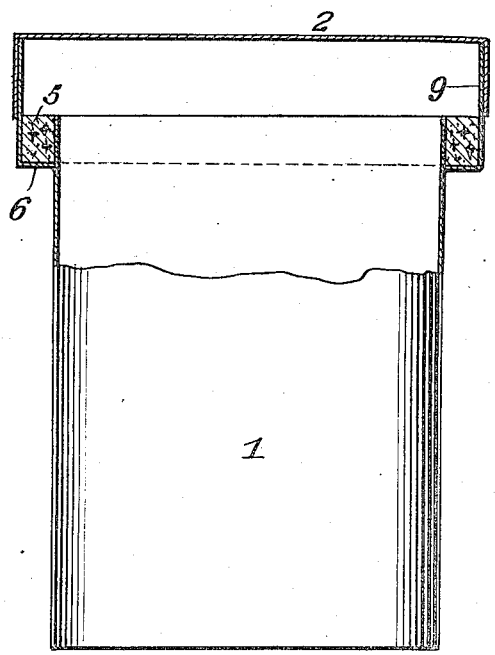
Fig. 2 is a similar section of a modified form.

The strip or body of cork is not necessarily carried by an internal ledge, as this ledge may be secured to the outside around the rim of the container as shown at 6 in Fig. 2, and in this case the outer wall 9 of the trough may be extended up so that a space is provided between the top of the cover and the filling of cork. The cover in such case fits down over the wall 9.

In other details the form or design of the container may be varied according to need or to taste. A handle or loops for holding a sustaining strap may be provided, and any proper material may be used in its construction.

We are aware that containers in endless variety have been used for flies and hooks, but they are not designed for nor capable of carrying flies in the manner herein described, where each is independent of the others and not in contact with any part of the device used for holding them.

Having now described our invention what we claim and desire to secure by Letters Patent is:

1. A container for artificial flies comprising an open end receptacle of the desired conformation, with a cover for the end of the same, and a strip or body of a material such as cork secured in the same around its edge below the top of the cover in which the hooks may be embedded permitting the snells to hang loosely in the open space below the same within the container.

2. A container for artificial flies comprising a flattened receptacle or box of metal adapted to be carried in the pocket, a watertight cover therefor, and a grooved flange or shelf around its edge below the cover filled with cork, into which the points of the hooks may be embedded while the snells hang down in the open space within.

3. A container for artificial flies comprising a flattened receptacle or box of aluminum, adapted to be carried in the pocket, a watertight cap or cover therefor, a trough-like flange around its edge and below the cover filled with cork into which the points of the hooks may be embedded while the snells hang down in the open space within.

In testimony whereof we hereto affix our signatures.

ARTHUR S. DRIVER.
SUSAN R. DRIVER.